United States Patent
Boucher

[11] 3,830,522
[45] Aug. 20, 1974

[54] ADJUSTABLE TRAILER TONGUE

[76] Inventor: Paul A. Boucher, 1957 Whipple, Carleton, Mich. 48117

[22] Filed: Jan. 17, 1973

[21] Appl. No.: 324,341

[52] U.S. Cl........ 280/405 R, 280/490 R, 280/414 R
[51] Int. Cl............................................. B60p 3/10
[58] Field of Search............ 280/490 R, 405 R, 414

[56] References Cited
UNITED STATES PATENTS

| | | | |
|---|---|---|---|
| 1,775,297 | 9/1930 | Towner | 280/490 R |
| 2,309,086 | 1/1943 | Arndt | 280/490 R X |
| 2,327,308 | 8/1943 | Johnston | 280/490 R X |
| 2,625,089 | 1/1953 | Pursche | 280/490 R X |
| 2,741,484 | 4/1956 | Fisher et al. | 280/490 R X |
| 3,235,284 | 2/1966 | Yant | 280/490 R X |

FOREIGN PATENTS OR APPLICATIONS 406,616  3/1934  Great Britain................. 280/150 D

*Primary Examiner*—Leo Friaglia
*Attorney, Agent, or Firm*—Harness, Dickey & Pierce

[57] ABSTRACT

An apparatus for leveling a single axle trailer adapted to be detachably connected to a towing vehicle such as a tractor, automobile, truck or the like, the apparatus comprising a drawbar or tongue having one end pivotably connected to the frame of the trailer, and an opposite end adapted to connectably receive a trailer hitch attached to the towing vehicle. The angle of inclination between the tongue and the longitudinal plane of the trailer frame is selectively adjusted via an actuating mechanism interposed between the trailer and the tongue whereby the imposed load of the trailer on the rear end of the towing vehicle can be selectively balanced.

12 Claims, 5 Drawing Figures

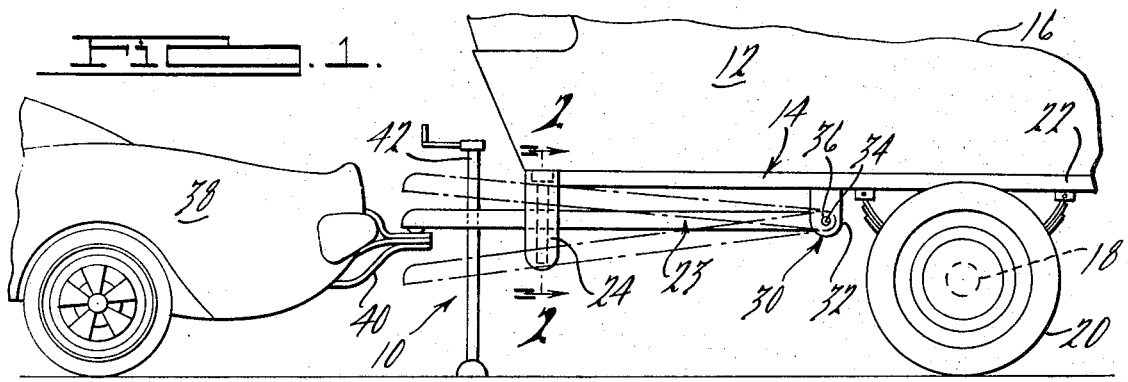
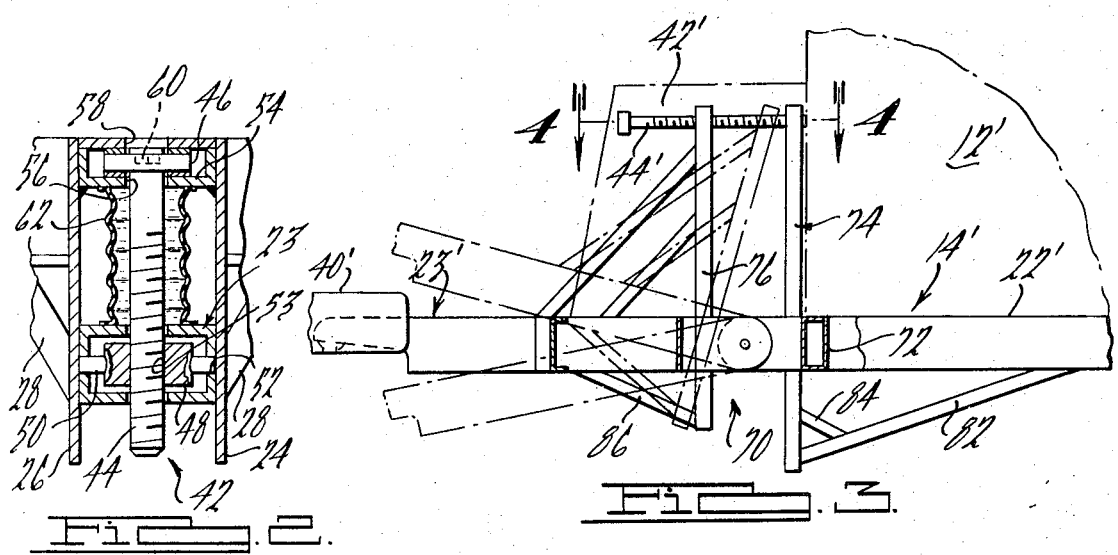
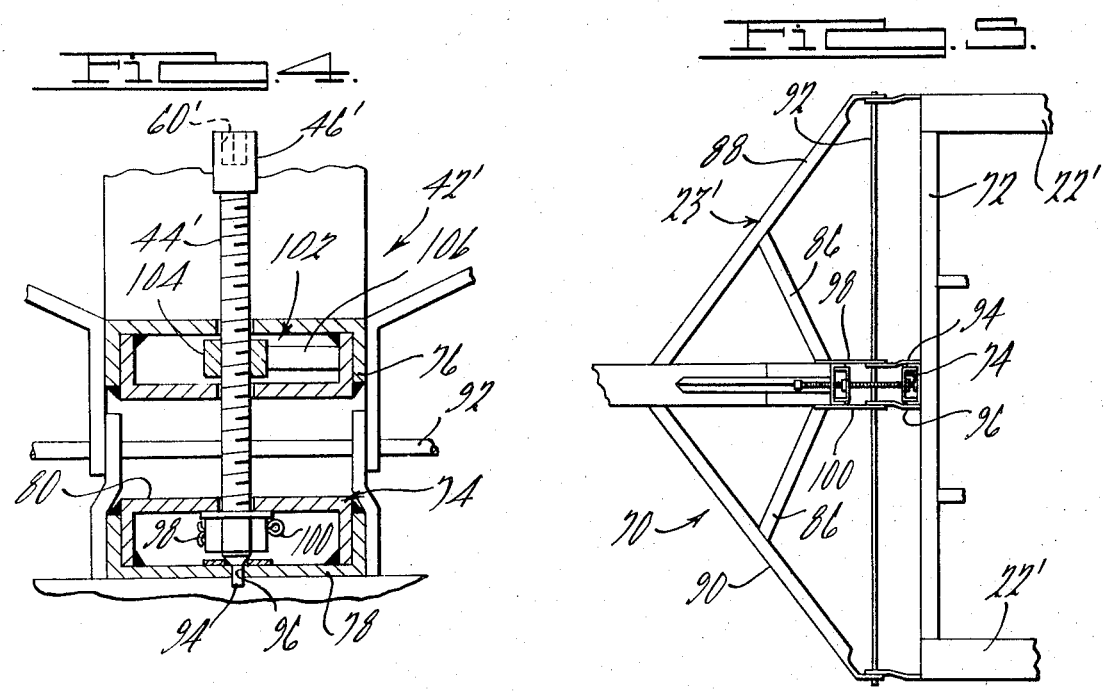

ADJUSTABLE TRAILER TONGUE

BACKGROUND AND SUMMARY OF THE INVENTION

This invention relates generally to vehicular leveling systems, and more particularly to an adjustable trailer tongue adapted for selectively balancing the load imposed by the trailer on the rear end of a pulling vehicle.

It has been found that the height of a trailer hitch assembly relative to the ground depends generally on the height of the rear bumper assembly of the vehicle, the method employed for attaching the hitch to the rear bumper or alternatively to the vehicle frame, and the attitude of the sprung portion of the vehicle relative to the unsprung portion. As will be appreciated, the dimensions and configurations of rear bumper designs vary from vehicle to vehicle, and trailer hitch assemblies are commercially available in a plurality of configurations and arrangements. Moreover, even if both the arrangement and dimensions of the bumper and the hitch were standardized, the height of the hitch would still be effected by the physical condition of the vehicle suspension system and various externally applied loads imposed thereon, such loads including the number of people occupying the vehicle and the weight of various articles stored in the trunk or other rearwardly located storage areas.

The problem is compounded when the arrangement and configuration of the trailer is considered. Generally speaking, a typical single axle trailer is comprised of a frame structure supported by a suspension system which can include various types of springs and shock absorbing devices interposed between the frame and the axle. One end of the frame is generally longitudinally extended and adapted to form an integral tongue for detachably connecting the trailer to the hitch. Depending on the load imposed on the suspension system and the initial height of the frame relative to the ground, it is only in the rarest of circumstances that the trailer is coincidentally leveled and selectively balanced relative to the towing vehicle. If the trailer is inclined downwardly towards the vehicle, the rear suspension of the vehicle must carry not only the normal load of the vehicle but additionally a portion of the load transmitted from the trailer. This additional loading can cause a serious reduction in the clearance between the rear axle of the vehicle and the frame or body portions thereof. This, of course, can result in frequent bottoming or engagement of these portions of the vehicle when the vehicles are driven over bumpy roads and the like, thus eliminating to a large extent the effectiveness of the vehicle suspension system. In addition, when the vehicle rear end is heavily loaded, the front end of the vehicle is disposed considerably above the rear portions thereof thereby causing the vehicle headlight beams to be directed upwardly which results in serious impairment of rearward vision and a road hazard to oncoming vehicles. On the other hand, if the trailer is inclined upwardly, the rear end of the vehicle tends to be raised or lifted relative to the ground which reduces the normal traction of the rear wheels. Moreover, when the rear ends of the vehicles are disposed below the front ends, the vehicle loses a certain amount of stability which is required for high speed turns made on modern turnpikes, expressways, toll roads, and the like.

The seriousness of these problems have heretofore been recognized in the automobile industry, as evident by the development of a large variety of auxiliary suspension units which frequently take the form of coil springs, flat leaf springs, air cylinders, and the like; however, it has been found that when such auxiliary suspension components have been incorporated in existing vehicle suspension systems, the performance and more particularly the balance of the suspension systems is frequently adversely affected. Additionally, many of such previously known auxiliary units have been difficult to install, have required the use of special fittings, complex brackets, and the like, and have not been universally applicable to various designs and makes of vehicles. The subject invention obviates the need for such auxiliary devices and permits the trailer to be leveled and balanced at the discretion of the operator.

It is accordingly a primary object of the present invention to provide a new and improved trailer leveling system adapted to overcome the heretofore encountered problems associated with the towing of single axle trailers.

It is another object of the present invention to provide a new and improved trailer leveling system of the above character which is easily operated, and which is adapted to be used on virtually all types of trailers, thereby providing for universality of application.

It is still another object of the present invention to provide a new and improved trailer leveling system of the above character that is extremely stable in a fixed operative position whereby to retain the trailer in a selectively balanced condition.

It is a further object of the present invention to provide a new and improved trailer leveling system of the above character which is durable in operation, and which may be easily installed on any form of a single axle trailer.

It is still a further object of the present invention to provide a new and improved trailer leveling system of the above character that is of relatively simple design, that consists of readily available component parts, and is therefore economical to commercially manufacture.

Other objects, features, and advantages of the present invention will become apparent from the following detailed description taken in conjunction with the accompanying drawings.

BRIEF DESCRIPTION OF THE DRAWINGS

FIG. 1 is a fragmentary side view of an exemplary first preferred embodiment of the adjustable trailer tongue operatively mounted on a trailer coupled to the rear end of a towing vehicle;

FIG. 2 is a cross sectional view of the trailer tongue illustrated in FIG. 1 taken on the lines 2—2 thereof;

FIG. 3 is a fragmentary side elevation of a second preferred embodiment of an adjustable trailer tongue in accordance with the present invention.

FIG. 4 is a cross sectional elevation of the adjustable trailer tongue illustrated in FIG. 3 taken on the lines 4—4 thereof; and FIG. 5 is a fragmentary plan view of the adjustable trailer tongue illustrated in FIG. 3.

DETAILED DESCRIPTION OF THE PREFERRED EMBODIMENTS

For convenience of description, the terms "upper,"

"lower," "front," "rear" and words of similar import, will have reference to a trailer having a leveling system in accordance with the present invention and described hereinafter in detail. Likewise, the terms "inner," "outer," and directives thereof shall have reference to the geometric center of a tongue or drawbar section of the trailer and including various component parts thereof.

Referring now in detail to the drawing, a trailer leveling system 10 in accordance with an exemplary first embodiment of the present invention, is shown in operative association with a single axle travel or house trailer, indicated generally at 12. Although the present invention will find varied application with many other types of trailers, due to the especially useful application of the present invention with a typical, single axle, house trailer, the present invention is shown and described, by way of example in operative association therewith. Moreover, as shall hereinafter become apparent, the principals of the subject invention may be utilized in combination with a boat trailer due to its adjustable nature which can obviate many of the difficulties normally encountered in launching a boat.

As illustrated in FIG. 1, the trailer 12 is comprised of a sprung portion including a frame 14 and a mobile housing structure 16 supported thereon, and an unsprung portion including a laterally extending axle 18 rotatably supporting a pair of wheels 20 spaced on opposite lateral sides thereof. Preferably, the sprung portion is supported by a suitable suspension system which can include spring and shock absorbing means as is conventional in the art.

The frame structure 14 can be of any conventional construction and, by way of example, can include a pair of longitudinally extending beams 22 and a plurality of laterally extending cross beam members (not shown). The forward end of the beams 22 are conventionally tapered inwardly and connected to define an enlarged V-shaped section having an apex centrally located relative to the transverse axis of the trailer 12. The V-shaped front section can be suitably strengthened by various reinforcing bars and plates and in accordance with the subject invention is utilized to provide a guide means for an adjustable tongue or drawbar, indicated generally at 23. The guide means is comprised of a pair of downwardly extending, laterally spaced, guide plates 24 and 26 having an upper end fixedly connected to the frame by any suitable means such as welding, bolting, and riveting. The lower cantilevered portion of the plates 24 and 26 may be strengthened by suitable reinforcing bars or struts, indicated at 28 in FIG. 2, and extending between the outer marginal surface of the plates 24 and 26 and the frame 14. The inner marginal surfaces of the plates 24 and 26 precludes lateral movement of the tongue 23 but permits relative vertical movement as shall hereinafter be explained.

As best seen in FIG. 1, the right end of the tongue 23 is pivotably connected to the frame 14 via a suitable bracket means indicated generally at 30. By way of example, the means 30 can include a pair of downwardly extending, laterally spaced plates 32 having an upper end fixedly connected to the structure 14, and preferably being fabricated from a relatively rigid steel sheet material to permit a welded connection. The lower end of each of the plates 32 includes an aligned aperture 34 adapted to cooperatively receive a suitable rod or pin 36 for pivotably supporting the tongue 23. The opposite or left end of the tongue 23 is detachably connected via a conventional trailer hitch assembly 40 to a suitable towing vehicle, such as a passenger car or the like, indicated generally at 38. The details of the assembly 40 form no part of the subject invention and can be of any suitable design. The tongue 23 can also be utilized to support an adjustable front end stand 42 which also can be of any conventional construction known in the art.

In the subject invention, the frame structure 14 is selectively horizontally inclined relative to the tongue 23 by an actuating mechanism indicated generally at 42. As best seen in FIG. 2, the mechanism 42 is comprised of a feed screw 44 having a radially enlarged head 46, and a trunnion member 48 having oppositely spaced end sections 50 journalled in apertures 52 located in the side walls of the tongue 23 and a threaded bore 53 adapted to cooperatively receive the feed screw 44. The enlarged head 46 and the feed screw 44 is disposed in a rectangular shaped passage formed by a horizontally extending plate 54, the latter being downwardly spaced from the upper surface of the frame structure 14 and fixedly connected on opposite lateral sides by any suitable means such as welding. The feed screw 44 extends through a vertically extending circular bore or passage 56 located in the plate 54 which is aligned, or coaxial with, a similarly shaped passage 58 located in the upper surface of the structure 14. In the subject invention, the feed screw 44 is selectively rotated by engaging an inwardly extending socket formation 60 by a suitable ratchet, socket wrench or the like. Preferably, the mechanism 42 also includes a suitable dirt shield 62 to protect the threaded section of the feed screw 44 and, by way of example, can be a section of expandable hose.

In operation, the feed screw 44 is selectively rotated to incline the frame structure 14 relative to the tongue 23 whereby to increase or decrease the attitude of the front end of the frame structure 14 and correspondingly increase or decrease the applied load of the trailer 12 on the rear end of the vehicle 38. In response to rotation of the feed screw 44 it will be noted that the trunnion member 48 pivots about its central horizontal axis to maintain the coaxial engagement of the threads and to preclude any interference therebetween. An alternate form of the member 48 which can also be used in the first preferred embodiment will hereinafter be described in conjunction with the second embodiment.

The second embodiment of a trailer leveling system is indicated at 70 in FIGS. 3 and 5. For purposes of clarity, identical or analogous elements, components, and assemblies are indicated by the same numeral used in conjunction with the first embodiment but designated with the addition of a prime (') suffix. With reference to the drawings, an exemplary trailer 12' includes a frame structure 14' comprised of first and second, laterally spaced, longitudinally extending, beams 22' and a plurality of longitudinally spaced cross beams, one of which is indicated at 72. Each of the beams 22' project outwardly relative to the front face of the beam 72 and define connecting clips adapted for pivotably connecting one end of a tongue or drawbar structure 23'. The opposite or left end of the tongue 23' is adapted to be detachably connected to the towing vehicle 38 via a trailer hitch assembly 40', the assembly 40' again being of any conventional design known in the art.

In the subject invention the tongue 23 is selectively pivoted about a horizontal axis by manipulation of an actuating assembly 42' including a feed screw 44' interposed between first and second vertically extending columns 74 and 76. As best seen in FIG. 4, a preferred construction of the columns 74 and 76 will be seen as being comprised of a pair of channels 78 and 80 having flange portions welded together to form a beam of boxlike configuration. The column 74 is fixedly attached to the front surface of the trailer 12' as, for example, by welding the column 74 to the outer marginal surface of the lateral beam 72. The column 74 extends downwardly a preselected distance relative to the lower surface of the frame structure 22', and is strengthened and rigidly supported by one or more struts indicated generally and by way of example at 82 and 84, respectively.

Correspondingly, the column 76 is fixedly connected to the tongue structure 23' and preferably is also rigidly supported by one or more reinforcing struts 86, the latter having one end connected to the lower end of the column 76 and an opposite end connecting a pair of inward, angularly inclined side members 88 and 90, respectively. The right end of each of the members 88 and 90 is respectively pivotably connected to the clips formed at the left end of the beam 22' by a suitable connecting rod 92. The connecting rod also engages a pair of connecting clips 94 and 96 located on opposite lateral sides of the column 74 and a second pair of clips 98 and 100, respectively located on opposite lateral sides of the column 76.

The tongue 23' is inclined downwardly and upwardly in response to rotation of the feed screw 44'. As best seen in FIG. 4, the feed screw 44' includes an enlarged head 46' including a socket portion 60' adapted to receive a ratchet, socket wrench, or the like. The opposite end of the feed screw 44' is formed with a cylindrically shaped section 94 of the decreased diameter relative to the threaded section thereof. The section 94 is rotatably supported in an aperture 96 disposed in the web of the channel 78 and longitudinally secured thereto by a nut 98 fixedly secured to the threaded section of the feed screw 44' by a key 100 and disposed in a rectangularly shaped cross sectional passage defined by the channels 78 and 80. As indicated previously, a trunnion member 48 may also be located in the column 76, or alternatively, the member 48 may be replaced with a threaded collar member indicated generally at 102. In this regard, the member 102 can be comprised of a threaded annulus 104 connected at its outer periphery to a longitudinally extending arm 106, the latter being of a greater length relative to the distance between the centerline of the feed screw 44 and the outer side flange of the column 76 whereby rotational movement of the arm is restricted by the oppositely spaced flanges. As will be appreciated, the member 102 functions in an analogous manner as the trunnion 48 and permits relative induction of the feed screw 44 relative to the horizontal axis of the column 76. Preferably, the leveling system 70 also includes a generally rectangularly shaped housing 108 which generally surrounds the actuating mechanism 42 and which functions as a dirt shield to preclude the ingress of mud, dirt, sand, or the like. The system 70 can be operated via rotational manipulation of the feed screw 44' to pivotably incline the tongue 23' upwardly and downwardly whereby to selectively balance the level the trailer 12' and accordingly facilitate a control of the applied load acting on the rear end of the towing vehicle 38.

It will be noted that the actuating mechanisms 42 and 42' of the first and second embodiments of the subject invention are described as being manually operated by means of a ratchet, socket wrench, or the like. If desired, however, a power assist, such as an electrical motor can be drivingly connected to the feed screw 44 or 44' and actuated from a switch located on the dashboard of the towing vehicle or from any other suitably convenient location. Moreover, it is within the purview of the subject invention to provide some type of leveling indicator means to appraise the vehicle operator of a properly adjusted attitude of the trailer 12 or 12' relative to the towing vehicle 38. In this regard the indicator means can be a suitably located and graduated sight glass or, by way of example, a pointer. With respect to the latter, the pointer can be freely pivotably connected at an end to the trailer, trailer frame, or other associated portion thereof, and can include a suitable indexing or scribe line located at an opposite end. As will be appreciated when the location of the pointer coincides or aligns with the scribe line, the trailer will be located in a preselected attitude. In either of the exemplary indicator means described, it will be noted that it is preferred to preload to some extent the rear suspension system of the vehicle as opposed to precisely maintaining a balanced condition, and that various additional graduation may be employed for effecting this purpose.

While it will be apparent that the preferred embodiments of the adjustable trailer tongue illustrated herein are well calculated to fulfill the objects above stated, it will be appreciated that the present invention is susceptible to modification, variation, and change without departing from the scope of the invention.

What is claimed is:

1. A leveling system for a single axle trailer adapted to be connected to a towing vehicle comprising:
 a rigid drawbar having one end located beneath said trailer and pivotably connected to said trailer proximate said axle, said drawbar also including an opposite end adapted to be connected to said vehicle; and
 means operatively supported between said ends of said drawbar and said trailer for selectively leveling said trailer relative to the attitude of said drawbar.

2. The system as recited in claim 1 wherein said means includes a feed screw having a first and second portion rotatably supported by drawbar and said trailer, respectively.

3. The system as recited in claim 2 wherein said drawbar includes a pair of oppositely spaced sidewalls, and wherein said system includes a trunion element rotatably supported by said sidewalls and having a bore for threadably receiving said feed screw.

4. The system as recited in claim 1 which includes guide means connected to said trailer for preventing lateral movement of said drawbar relative to said trailer.

5. The system as recited in claim 4 wherein said guide means includes a pair of laterally spaced guide plates located on opposite sides of said drawbar.

6. The system as recited in claim 1 which includes shielding means for preventing the ingress of foreign particles to said means.

7. The system as recited in claim 6 wherein said shielding means includes a section of expandable hose.

8. A trailer having a load supporting frame and an axle arrangement located centrally between oppositely spaced front and rear ends of said frame and adapted for rotatably supporting opposite laterally spaced wheel means, in combination with a system for selectively maintaining said trailer in a substantially level attitude, said system comprising:
- a bracket located proximate said axle arrangement and fixedly connected to the underside of said frame;
- a rigid drawbar having a first end pivotably connected to said bracket and an opposite end adapted to be detachably connected to a towing vehicle;
- guide means connected to the front section of said frame and cooperative with said drawbar for preventing relative lateral movement, said guide means including a pair of parallel surfaces located on opposite sides of said drawbar; and
- actuating means coactive with said guide means and said drawbar for selectively raising and lowering the front end of said frame relative to the disposition of said drawbar.

9. The combination as recited in claim 8 wherein said guide means comprises a pair of downwardly extending, parallel spaced side plates and first and second spaced, laterally extending connecting members located across an upper portion of said side plates, said first and second members and said side plates defining a rectangular shaped passage.

10. The combination as recited in claim 9 wherein said actuating means includes a feed screw having an enlarged head supported in said passage and which includes a trunnion member rotatably supported by said guide means and having a threaded aperture threadably connected to said feed screw.

11. The combination as recited in claim 8 wherein said drawbar has a rectangular shaped cross-section and defines a continuous beam between said connection with said towing vehicle and said bracket, and wherein said trailer frame is pivotable relative to said drawbar.

12. The combination as recited in claim 11 which includes an adjustable front end stand connected to said drawbar and including means for selectively orienting said frame relative to said drawbar.

* * * * *